Feb. 14, 1967   G. REUGE   3,303,734
MUSICAL CHRISTMAS BALL
Filed Oct. 25, 1963

INVENTOR
GUIDO REUGE

BY Wenderoth, Lind n Ponack
ATTORNEYS

United States Patent Office 3,303,734
Patented Feb. 14, 1967

3,303,734
MUSICAL CHRISTMAS BALL
Guido Reuge, 21 Rue des Rasses, Sainte-Croix,
Vaud, Switzerland
Filed Oct. 25, 1963, Ser. No. 318,956
Claims priority, application Switzerland, Nov. 1, 1962,
12,820/62
2 Claims. (Cl. 84—95)

The present invention concerns a Christmas ball of plastic material formed of two semispherical caps of small thickness relative to their diameter, these caps being metallized inside and joined edge to edge.

Although such balls do not break like glass balls, they have the drawback of being too easily distorted and spoilt in spite of all the precautions taken for their transport and use. In fact, the thin cover of plastic material does not offer any resistance to staving in and becomes dented under the effect of low pressure.

Christmas balls of plastic material formed of two thick semispherical caps have the drawback of being heavier and of having less brilliant colors, the thickness of the plastic material giving a distorting reflection.

The present invention aims at removing these drawbacks and the Christmas ball which is the object thereof is characterized in that it comprises an inner support, taking the exact shape of the inner wall of the semispherical caps, in order to maintain the shape of the ball and thus withstand a staving in of its surface.

The accompanying drawing shows, by way of example, embodiments of the Christmas ball forming the object of the present invention.

Figure 1:
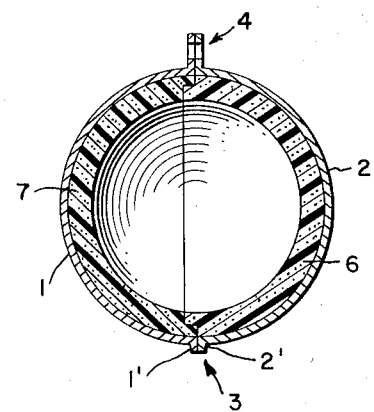
Figure 2:
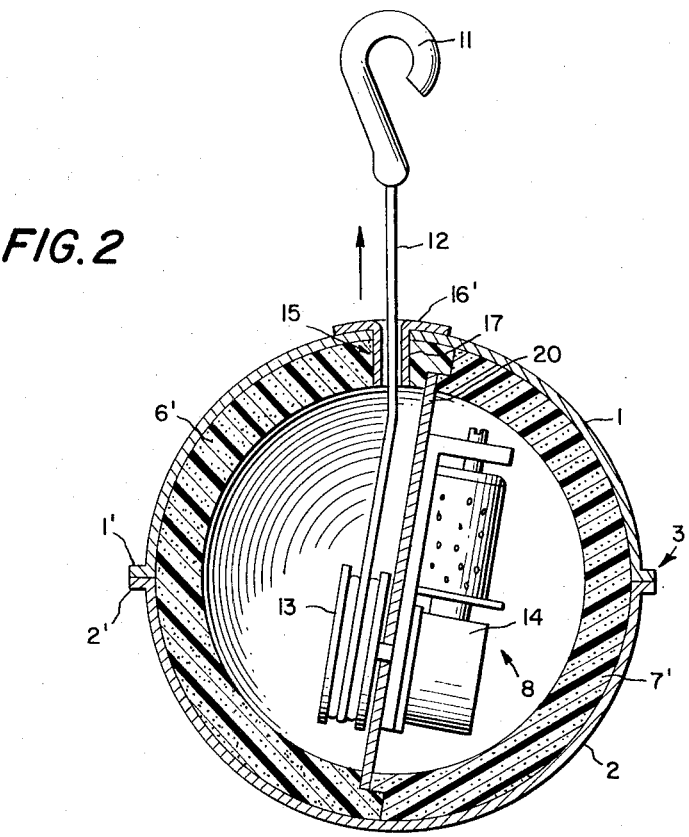

FIGS. 1 and 2 are sections through diametral planes of these embodiments.

The balls shown in FIGS. 1 and 2 are each formed of two semispherical caps 1 and 2 of plastic material, the thickness of which is small relative to the diameter of the ball, for example of a few tenths of a millimeter. This plastic material is, for example, colored polyvinyl chloride in sheets. The caps 1 and 2 are metallized inside and are joined edge to edge as shown at 3 along flanges 1' and 2' respectively, extending in a vertical plane.

The embodiment of FIG. 1 comprises an attachment eyelet 4 of one piece with the flanges 1' and 2' of the semispherical caps 1 and 2 serving to secure a suspending member (not shown) for the ball.

In the embodiment of FIG. 1, the inner support is formed by semispherical sheels 6 and 7, for example, of porous plastic material.

This inner support could also be constituted by a shell of one piece and in a modified form, one could employ an inflatable casing designed to support interiorly the semispherical caps 1 and 2.

In the embodiment of FIG. 2, the Christmas ball contains a musical movement of known type indicated in a general manner by 8 and the semispherical caps 1 and 2 are joined by their flanges 1' and 2' respectively, situated in a horizontal plane.

A suspending hook 11 fixed to a winding cord 12 serves to suspend the ball, for example, to a branch of a Christmas tree. The cord 12 winds in known manner round a pulley 13 wedged on the spindle for winding the spring disposed inside the drum 14 of the musical movement 8. A supporting member 15 is disposed inside the ball, between the musical movement and the inner surface of the cap 1 at the point where the cord 12 penetrates into the ball. This supporting member 15 has a supporting collar 16', entering into contact with the outer surface of the cap 1 and a tubular portion 17 serving as a guide for the cord 12.

In order to wind up the musical movement 8, one grips the ball in one hand and pulls the cord 12 in the direction of the arrow. This cord, while unwinding from the pulley 13 drives the latter to rotate and with it the spindle of the spring which is thus wound up. During this operation, the force exerted by the cord on the musical movement is distributed uniformly on the inner wall of the cap 1. When the musical movement works, the cord rewinds itself on the pulley 13 until the hook 11 abuts the outer surface of the cap 1. When the hook 11 touches the ball, the musical movement stops and there remains the strength of the spring which pulls the cord and the hook 11 against the ball.

The tube 15 must therefore bear against the movement and the cap or the hook in order to avoid that the ball be distorted at the position of the hook. The force exerted at that movement on the hook 11 tends to push the wall of the cap inwardly. This staving in is however prevented by the collar 16 and the supporting member 15.

In order to improve the resonance, one can either provide recesses in the plastic material, these recesses forming a resonance box, or provide an inner support of two semispherical shells as in the case of FIG. 1 of a non-porous plastic material. Such an arrangement is shown in FIG. 2 in which the shells 6' and 7' are joined along a plane inclined relative to the vertical, so as to place the centre of gravity of the musical movement as near as possible to the vertical plane passing through the cord 12. This inclined arrangement also permits of centering the musical movement inside the ball. A diaphragm 20 is fixed between the shells 6' and 7' at their junction and serves, on the one hand, as a support for the musical movement and, on the other hand, as a resonance member. This diaphragm may be constituted, for example, by a wooden disc or of plastic material.

The Christmas ball described offers the advantage of withstanding shocks and crushing pressure, which permits of avoiding the use of expensive wrappers for the transport of such balls.

Instead of being fixed edge to edge by the flanges 1' and 2' the semispherical caps 1 and 2 could have edges without flanges, joined by means of a covering band or ring, transparent or not. The caps could also have overlapping edges, the assembly being then effected, for example, by gluing.

What I claim is:
1. A Christmas ball comprising a thin external shell, an internal plastic supporting member, said external shell being formed of two transparent, inwardly metallized semispherical pieces of colored plastic material joined edge to edge to fit closely on said internal supporting member, said internal supporting member having a diaphragm, a musical movement mounted on said diaphragm, a winding mechanism for said movement, a tubular piece on said supporting member, a pulling winding cord for said movement passing through said tubular piece and serving also to hang the ball, said diaphragm acting as a resonance member.

2. A Christmas ball according to claim 1, wherein said tubular piece is provided with a collar bearing on the external shell.

References Cited by the Examiner
UNITED STATES PATENTS
2,095,648   12/1937   Oftedahl _____ 161—16 X
2,504,650    4/1950   Chessrown.

FOREIGN PATENTS
1,071,553   12/1959   Germany.
  336,302    3/1959   Switzerland.

JACOB H. STEINBERG, Primary Examiner.